(12) United States Patent
Porfiri et al.

(10) Patent No.: US 11,785,499 B2
(45) Date of Patent: Oct. 10, 2023

(54) CONTROLLING TIMEOUT EVENTS FOR DATA PACKET TRANSMISSIONS

(71) Applicant: Telefonaktiebolaget LM Ericsson (publ), Stockholm (SE)

(72) Inventors: Claudio Porfiri, Stockholm (SE); Federico Zuccardi Merli, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 87 days.

(21) Appl. No.: 17/437,286

(22) PCT Filed: Mar. 14, 2019

(86) PCT No.: PCT/SE2019/050227
§ 371 (c)(1),
(2) Date: Sep. 8, 2021

(87) PCT Pub. No.: WO2020/185133
PCT Pub. Date: Sep. 17, 2020

(65) Prior Publication Data
US 2022/0166549 A1 May 26, 2022

(51) Int. Cl.
*H04L 1/08* (2006.01)
*H04L 1/16* (2023.01)
(Continued)

(52) U.S. Cl.
CPC ........... *H04W 28/0273* (2013.01); *H04L 1/08* (2013.01); *H04L 1/188* (2013.01);
(Continued)

(58) Field of Classification Search
CPC ..... H04L 1/0001–248; H04L 43/02–55; H04L 47/10–83; H04L 69/02–40;
(Continued)

(56) References Cited

U.S. PATENT DOCUMENTS 6,643,259 B1 * 11/2003 Borella .................. H04L 47/27
8,583,053 B1 * 11/2013 Mahbod ................. H04L 1/188
(Continued)

OTHER PUBLICATIONS

R. Stewart; Stream Control Transmission Protocol; Network Working Group, RFC: 4960; The IETF Trust; Sep. 2007, consisting of 152-pages. (Year: 2007).*
(Continued)

*Primary Examiner* — Timothy J Weidner
(74) *Attorney, Agent, or Firm* — Christopher & Weisberg, P.A.

(57) ABSTRACT

The present disclosure relates to a method of controlling a timeout event for a data packet transmission in a wireless communications network, and a node performing the method. In an aspect, a method of controlling a timeout event for a data packet transmission in a wireless communications network is provided, wherein a data packet retransmission timer initially is set to a timeout value indicating the maximum allowed round-trip time (RTT) for the data packet transmission and a timeout event occurs upon the retransmission timer expiring. The method includes observing the RTT for the data packet transmission over a connection in the network, increasing, upon the retransmission timer expiring before a measured value is available for the observed RTT, the timeout value for the retransmission timer, and determining whether a currently set timeout value for the retransmission timer is to be decreased or not.

20 Claims, 6 Drawing Sheets

(51) Int. Cl.

| | | |
|---|---|---|
| *H04L 43/0829* | (2022.01) | |
| *H04L 43/0864* | (2022.01) | |
| *H04L 47/27* | (2022.01) | |
| *H04L 47/283* | (2022.01) | |
| *H04L 69/163* | (2022.01) | |
| *H04L 69/28* | (2022.01) | |
| *H04W 28/02* | (2009.01) | |
| *H04W 28/04* | (2009.01) | |
| *H04W 28/10* | (2009.01) | |
| *H04W 76/22* | (2018.01) | |
| *H04W 76/25* | (2018.01) | |
| *H04W 80/06* | (2009.01) | |
| *H04W 84/02* | (2009.01) | |
| *H04W 88/00* | (2009.01) | |
| *H04W 88/08* | (2009.01) | |
| *H04W 88/14* | (2009.01) | |
| *H04W 88/16* | (2009.01) | |
| *H04W 88/18* | (2009.01) | |
| *H04W 92/02* | (2009.01) | |
| *H04W 92/04* | (2009.01) | |
| *H04W 92/16* | (2009.01) | |
| *H04L 1/1867* | (2023.01) | |
| *H04W 28/084* | (2023.01) | |

(52) U.S. Cl.
CPC ...... *H04L 43/0829* (2013.01); *H04L 43/0864* (2013.01); *H04L 47/27* (2013.01); *H04L 47/283* (2013.01); *H04L 69/163* (2013.01); *H04L 69/28* (2013.01); *H04W 28/0284* (2013.01); *H04W 28/0289* (2013.01); *H04W 28/04* (2013.01); *H04W 28/084* (2023.05); *H04W 28/10* (2013.01); *H04W 76/22* (2018.02); *H04W 76/25* (2018.02); *H04W 80/06* (2013.01); *H04W 84/02* (2013.01); *H04W 88/005* (2013.01); *H04W 88/08* (2013.01); *H04W 88/14* (2013.01); *H04W 88/16* (2013.01); *H04W 88/18* (2013.01); *H04W 92/02* (2013.01); *H04W 92/04* (2013.01); *H04W 92/16* (2013.01)

(58) Field of Classification Search
CPC ..... H04W 24/02–10; H04W 28/02–26; H04W 76/10–50; H04W 80/02–06; H04W 84/02–16; H04W 88/005–188; H04W 92/02–24

See application file for complete search history.

(56) References Cited

U.S. PATENT DOCUMENTS

| | | |
|---|---|---|
| 2005/0190720 A1 | 9/2005 | Miyake et al. |
| 2009/0323527 A1 | 12/2009 | Accapadi et al. |
| 2016/0094462 A1 | 3/2016 | Heitz et al. |
| 2020/0304240 A1* | 9/2020 | Fu .......................... H04L 1/188 |

OTHER PUBLICATIONS

International Search Report and Written Opinion dated Dec. 10, 2019 for International Application No. PCT/SE2019/050227 filed Mar. 14, 2019, consisting of 11-pages.

V. Paxson et al.; Computing TCP's Retransmission Timer; Internet Engineering Task Force (IETF), RFC: 6298; 2011 IETF Trust; Jun. 2011, consisting of 11-pages.

Van Jacobson et al.; Congestion Avoidance and Control; ACM SIGCOMM Computer Communication Review; Nov. 1988, consisting of 25-pages.

R. Stewart; Stream Control Transmission Protocol; Network Working Group, RFC: 4960; The IETF Trust; Sep. 2007, consisting of 152-pages.

D. Jovev; Determining SCTP's Retransmission Timer draft-jovev-tsvwg-sctp-rto-00; Internet Engineering Task Force (IETF), Internet-Draft; 2017 IETF Trust; Sep. 21, 2017, consisting of 15-pages.

* cited by examiner

CONTROLLING TIMEOUT EVENTS FOR DATA PACKET TRANSMISSIONS

CROSS-REFERENCE TO RELATED APPLICATIONS

This application is a Submission Under 35 U.S.C. § 371 for U.S. National Stage Patent Application of International Application Number: PCT/SE2019/050227, filed Mar. 14, 2019 entitled "CONTROLLING TIMEOUT EVENTS FOR DATA PACKET TRANMISSIONS," the entirety of which is incorporated herein by reference.

TECHNICAL FIELD

The present disclosure relates to a method of controlling a timeout event for a data packet transmission in a wireless communications network, and a node performing the method.

BACKGROUND

Timers are used in protocols to supervise packet deliveries. In connection oriented protocols, such as Transmission Control Protocol (TCP) and Stream Control Transmission Protocol (SCTP), timer supervision expiration is used as an indication of a data packet being lost and of a need to retransmit the data packet. Timer values need to be large enough to provide a reasonable indication that the packet is lost, and at the same time short enough to guarantee that a lost packet is being resent as soon as possible.

In certain sub-parts of a network such as in a Radio Access Network (RAN), timers are also used as a confirmation that a link is out of service and further to ensure that resources are released within a well-defined time. As an example, cell release in case of SiAP link interruption is a key point indicator of Long-Term Evolution (LTE) RAN.

TCP and SCTP use the same mechanism for packet supervision, described for instance in RFC 4960 by Network Working Group.

Timer supervision is used to detect packet loss in the network, and TCP and SCTP both dynamically change congestion window size (i.e. the limit of total number of unacknowledged packets that may be in transit end-to-end) when timeout occurs, resetting it to single maximum transmission unit (MTU) size. This decrease of available bandwidth is done in order to prevent packet loss due to network congestion.

While the congestion control algorithm of SCTP as described in RFC 4960 is sufficient to guarantee good traffic characteristics when nodes are connected with a physical network, the introduction of software-defined networking (SDN) and virtualized networks where nodes are based on instances of virtual machines being connected provides a scenario that diverges from the traditional network scenarios for a number of reasons.

Firstly, round-trip time (RTT) for packet transfer between virtualized nodes is close to zero and less than 1 ms for most of the time.

Secondly, due to resource sharing, the virtualization environment uses a store and forward mechanism where packets are suddenly being stored for a certain amount of time before being delivered in a burst.

Thirdly, the available bandwidth for the virtualized nodes is larger than for nodes in a physical network.

Because of the available bandwidth, the store and forward mechanism will result in a single large value of RTT being preceded and followed by a great number of RTT values close to zero.

Thus, whenever a virtualized network node stores packets for a certain time, which packets subsequently are delivered, a timeout is generated even though no packets are lost. As previously mentioned, this will cause the congestion control algorithm to decrease the available bandwidth in order to prevent packet loss due to network congestion.

SUMMARY

One objective is to solve, or at least mitigate, this problem in the art and thus to provide an improved method of supervising timeout events of data packet transfer.

In a first aspect, this objective is attained by a method of controlling a timeout event for a data packet transmission in a wireless communications network, wherein a data packet retransmission timer initially is set to a timeout value indicating the maximum allowed round-trip time (RTT) for the data packet transmission and a timeout event occurs upon the retransmission timer expiring. The method comprises observing the RTT for the data packet transmission over a connection in the network, increasing, upon the retransmission timer expiring (S201$b$) before a measured value is available for the observed RTT, the timeout value for the retransmission timer, and determining whether a currently set timeout value for the retransmission timer is to be decreased or not.

In a second aspect, this objective is attained by a node configured to control a timeout event for a data packet transmission in a wireless communications network (10), wherein a data packet retransmission timer initially is set to a timeout value indicating the maximum allowed RTT for the data packet transmissions and a timeout event occurs upon the retransmission timer expiring. The node comprises a processing unit and a memory, said memory containing instructions executable by said processing unit, whereby the node is operative to observe the RTT for the data packet transmission over a connection in the network, increase, upon the retransmission timer expiring before a measured value is available for the observed RTT, the timeout value for the retransmission timer, and to determine whether a currently set timeout value for the retransmission timer is to be decreased or not.

Advantageously, the controlling of the timeout value for the retransmission timer will allow a dynamical and carefully controlled increase of the timeout value of the timer to avoid unnecessary timeouts, i.e. to cause a timeout even though no packets have been lost.

In an embodiment, an observation timer is started upon the timeout value for the retransmission timer is being increased.

In an embodiment, the timeout value for the retransmission timer is decreased upon a set observation timer expiring, wherein the observation timer is restarted.

Advantageously, the controlling of the timeout value for the retransmission timer will allow a dynamical and carefully controlled decrease of the timeout value of the timer to avoid too slow retransmission.

In an embodiment, the observation timer value is decreased for each available RTT measurement, given that it has not expired.

In an embodiment, the timeout value of the retransmission timer is controlled according to RFC 4960 after having been decreased down to the initially set timeout value.

In an embodiment, the initially set timeout value is set to a minimum allowable retransmission timeout (RTO) value.

In a third aspect, a computer program comprising computer-executable instructions for causing a node to perform the method of the first aspect when the computer-executable instructions are executed on a processing unit included in the node.

In a fourth aspect, a computer program product comprising a computer readable medium is provided, the computer readable medium having the computer program according to the third aspect embodied thereon.

Further embodiments will be disclosed in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which.

DETAILED DESCRIPTION

The aspects of the present disclosure will now be described more fully hereinafter with reference to the accompanying drawings, in which certain embodiments are shown.

These aspects may, however, be embodied in many different forms and should not be construed as limiting; rather, these embodiments are provided by way of example so that this disclosure will be thorough and complete, and to fully convey the scope of all aspects of the disclosure to those skilled in the art. Like numbers refer to like elements throughout the description.

An SCTP endpoint uses a retransmission timer T3 to ensure data delivery in the absence of any feedback from its peer. The duration of this timer is referred to as retransmission timeout (RTO). A trade-off must be made when setting RTO; if a too small value is selected, there is a risk that a timeout occurs even though data indeed would have been delivered while if a too great value is detected, the data retransmission will be slow. A retransmission will not make sense if such retransmission occurs long after any lost packet should have been delivered.

For SCTP, according to RFC 4960, the rules governing the computation of smoothed round-trip time (SRTT), round-trip time variation (RTTVAR), and RTO are as follows.

C1) Until an RTT measurement has been made for a packet sent to the given destination transport address, set RTO to the protocol parameter RTO.Initial.

C2) When the first RTT measurement R is made, set
SRTT=R,
RTTVAR=R/2, and
RTO=SRTT+4*RTTVaR.

C3) When a new RTT measurement R' is made, set
RTTVAR=(1−RTO.Beta)*RTTVAR+RTO.Beta*|SRTT−R'|, and
SRTT=(1−RTO.Alpha)*SRTT+RTO.Alpha*R',
where the value of SRTT used in the update to RTTVAR is it value before updating SRTT itself using C3.

Thereafter, RTO is updated as RTO=SRTT+4*RTTVAR (eq. 1)

It should further be noted that RFC 4960 comprises recommended values for SCTP protocol parameters RTO.Initial, RTO.Alpha, RTO.Beta as well as for RTO.Min (being the smallest possible allowed value for RTO) and for RTO.Max (being the largest possible allowed value for RTO):

RTO.Initial=3 seconds,
RTO.Min=1 second,
RTO.Max=60 seconds,
RTO.Alpha-⅛, and
RTO.Beta-¼.

However, for a Radio Access Network (RAN) deployment, the above given values for RTO.Initial, RTO.Min and RTO.Max are too high.

For a virtualized environment where the RTT is close to zero (unless the store and deliver mechanism is applied as previously described), the computed values of RTTVAR, SRTT and RTT will consequently be very small. RFC 4960 stipulates that a computed value of RTO being less than RTO.min is rounded up to RTO.min.

Hence, for a RAN deployment, the values for RTO.Initial, RTO.Min and RTO.Max would rather be selected to:

RTO.Initial=200 milliseconds,
RTO.Min=100 millisecond, and
RTO.Max=400 milliseconds.

Figure 1:
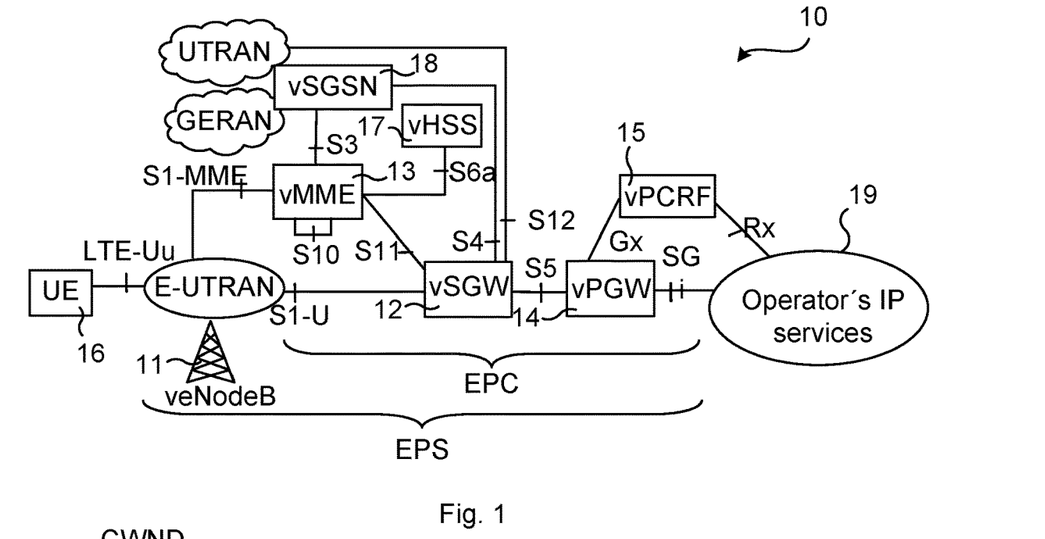
FIG. 1 shows a schematic overview of an exemplifying wireless communications network in which the embodiments can be implemented.

FIG. 1 shows a schematic overview of an exemplifying wireless communications network 10 in which embodiments can be implemented. The wireless communications network 10 is a Long Term Evolution (LTE) based network. It should be pointed out that the terms "LTE" and "LTE based" network is here used to comprise both present and future LTE based networks, such as, for example, advanced LTE (LTE A) networks. It should be appreciated that although FIG. 1 shows a wireless communications network 10 in the form of an LTE based network, the example embodiments herein may also be utilized in connection with other wireless communication networks, such as e.g. 5G type networks or Universal Mobile Telecommunications System (UMTS), comprising nodes and functions that correspond to the nodes and functions of the network in FIG. 1.

As can be seen in FIG. 1, the network 10 has been virtualized, where the nodes are illustrated in virtualized versions commonly referred to as virtualized network functions (VNFs) or virtual machines (VM). This is indicated in FIG. 1 by means of the letter "v" preceding a node name, such as "vMME" thus indicating a "virtual MME".

The wireless communication network 10 comprises a base station in the form of a veNodeB 11, operatively connected to a virtual Serving Gateway 12 (vSGW) 12, in turn operatively connected to a virtual Mobility Management Entity 13 (vMME) and a virtual Packet Data Network Gateway 14 (vPGW), which in turn is operatively connected to a virtual Policy and Charging Rules Function (vPCRF) 15. The veNodeB 11 is a radio access node that interfaces with a mobile radio terminal, e.g. a UE 16. The veNodeBs of the network forms the radio access network Evolved Universal Terrestrial Radio Access Network (E-UTRAN) for LTE communicating with the UEs over an air interface such as LTE-Uu. The core network in LTE is known as Evolved Packet Core (EPC), and the EPC together with the E-UTRAN is referred to in LTE as the Evolved Packet System (EPS). The vSGW 12 routes and forwards user data packets over the S1-U interface, whilst also acting as the mobility anchor for the user plane during inter-eNodeB handovers and as the anchor for mobility between LTE and other 3GPP technologies (terminating S4 interface and relaying the traffic between 2G/3G networks and the vPGW 14). For idle state UEs, the vSGW 12 terminates the downlink (DL) data path and triggers paging when DL data arrives for the UE 16, and further manages and stores UE contexts, e.g. parameters of the IP bearer service, network internal routing information. It also performs replication of the user traffic in case of lawful interception. The vSGW 12 communicates with the vMME 13 via interface S11 and with the vPGW 14 via the S5 interface. Further, the vSGW 12 may communicate with the UMTS radio access network UTRAN and with the GSM EDGE ("Enhanced Data rates for GSM Evolution") Radio Access Network (GERAN) via the S12 interface.

The vMME 13 is responsible for idle mode UE tracking and paging procedure including retransmissions. It is involved in the bearer activation/deactivation process and is also responsible for choosing the vSGW 12 for a UE 16 at the initial attach and at time of intra-LTE handover involving core network node relocation. It is responsible for authenticating the user by interacting with the virtual Home Subscriber Server (vHSS) 17. The Non-Access Stratum (NAS) signaling terminates at the vMME 13 and it is also responsible for generation and allocation of temporary identities to UEs via the S1-MME interface. It checks the authorization of the UE 16 to camp on the service provider's Public Land Mobile Network (PLMN) and enforces UE roaming restrictions. The vMME 13 is the termination point in the network for ciphering/integrity protection for NAS signaling and handles the security key management. Lawful interception of signaling is also supported by the vMME. The vMME 13 also provides the control plane function for mobility between LTE and 2G/3G access networks with the S3 interface terminating at the vMME 13 from a Serving GPRS ("General Packet Radio Service") Support Node (SGSN) 18. The vMME 13 also terminates the S6a interface towards the home vHSS 17 for roaming UEs. Further, there is an interface S10 configured for communication between vMMEs for vMME relocation and vMME-to-vMME information transfer.

The vPGW 14 provides connectivity to the UE 16 to external packet data networks 19 (PDNs) by being the point of exit and entry of traffic for the UE 16. A UE may have simultaneous connectivity with more than one vPGW for accessing multiple PDNs. The vPGW 14 performs policy enforcement, packet filtering for each user, charging support, lawful interception and packet screening. Another key role of the vPGW 14 is to act as the anchor for mobility between 3GPP and non-3GPP technologies such as WiMAX and 3GPP2 (CDMA 1X and EvDO). The interface between the vPGW 14 and the packet data network 19 is referred to as the SGi. The packet data network may be an operator external public or private packet data network or an intra operator packet data network, e.g. for provision IP Multimedia Subsystem (IMS) services.

The vPCRF 15 determines policy rules in real-time with respect to the radio terminals of the network. This may e.g. include aggregating information in real-time to and from the core network and operational support networks, etc. of the network so as to support the creation of rules and/or automatically making policy decisions for user radio terminals currently active in the network based on such rules or similar. The vPCRF 15 provides the vPGW 14 with such rules and/or policies or similar to be used by the acting vPGW as a Policy and Charging Enforcement Function (PCEF) via interface Gx. The vPCRF further communicates with the packet data network 19 via the Rx interface.

The embodiments described in the following could be implemented in any appropriate virtual node in the network 10, such as for instance in the vMME 13, where the vMME 13 could be configured to control packet data retransmission timeout based on RTT observations between UEs 16 and the veNodeB 11.

Figure 2:
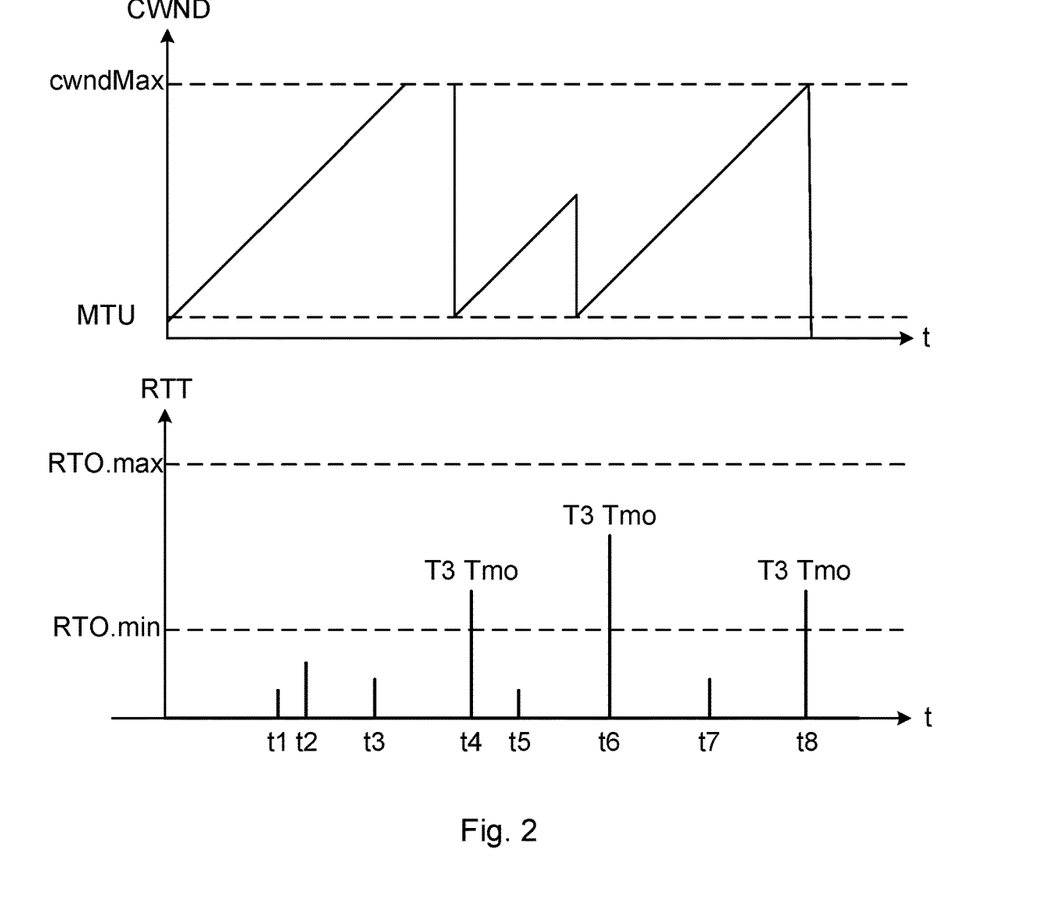
FIG. 2 illustrates a behaviour of a prior art packet timeout supervision mechanism in TCP.

FIG. 2 illustrates the behaviour of the packet timeout supervision mechanism in TCP, where the upper diagram illustrates the dynamic control of the size of the congestion window (CWND), i.e. the total number of unacknowledged packets that may be in transit end-to-end in the network 10, while the lower diagram illustrates the value of RTT observed at different points in time $t_n$. As is understood, during a timeout event, there is no RTT measurement available, since—due to the nature of a timeout—the retransmission timer T3 has expired thus causing the event.

Now, initially the CWND will be set to its minimum size, referred to as the single maximum transmission unit (MTU) size, thereby limiting the available bandwidth.

As RTT values being less than when RTO.min are continuously measured at $t_1$, $t_2$ and $t_3$, i.e. the retransmission timer T3 has not reached RTO.min being the value where the timer T3 expires, the size of the CWND is increased at each measured RTT until a maximum CWND limit cwndMax is reached reflecting a maximum allowed bandwidth in the network. As is shown in FIG. 2, the timer T3 exceeds the RTO timeout value at $t_4$, i.e. T3>RTO.min, and a timeout occurs (denoted T3 Tmo), in which case the CWND is reset to MTU size. As previously mentioned, this decrease of available bandwidth is done in order to prevent packet loss due to network congestion.

Therefore, as soon as all data being affected by the timeout are successfully transmitted, another RTT measurement is performed and the size of CWND is increased, until a second T3 timeout occurs at $t_6$, and so on.

For a virtualized environment utilizing the store and deliver mechanism, this behaviour will occasionally cause a timeout event even though no packets have been lost.

Figure 3:
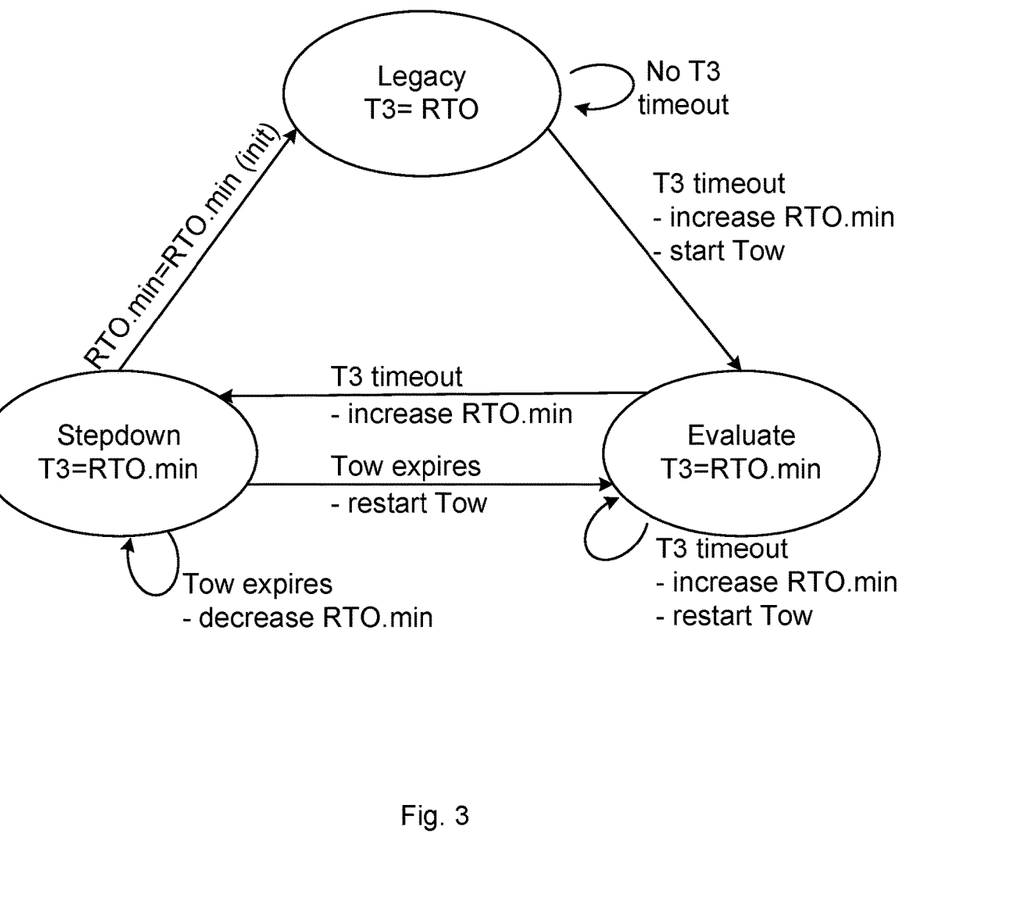
FIG. 3 shows a state machine illustrating a method of controlling timeout for data packet transmissions in a wireless communications network according to an embodiment.

FIG. 3 shows a state machine illustrating a method of controlling timeout for data packet transmissions in a wireless communications network according to an embodiment.

The state machine is triggered by either a new RTT measurement being available or by a T3 timeout occurring.

The ground state of the state machine is referred to as Legacy state, being the prior art state of RFC 4960 where the retransmission timer T3 is set to an appropriate RTO computed according to eq. 1. If in the Legacy state T3>RTO as computed according to eq. 1, a timeout occurs. Hence, if for a connection the retransmission timer T3 expires before the RTT measurement is available for that connection, a timeout occurs since the (still not available) RTT is deemed too long.

Should no timeout occur in the Legacy state, the RTO is continuously computed according to eq. 1, as illustrated in the diagrams of FIG. 2, where the T3 timer is set to the higher value of the continuously computed RTO and RTO.min. As previously mentioned, for a virtualized environment, the continuously computed RTO will in most cases be less than RTO.min (unless the store and deliver mechanism is applied). Thus, the size of CWND will eventually reach cwndMax.

Figure 4:
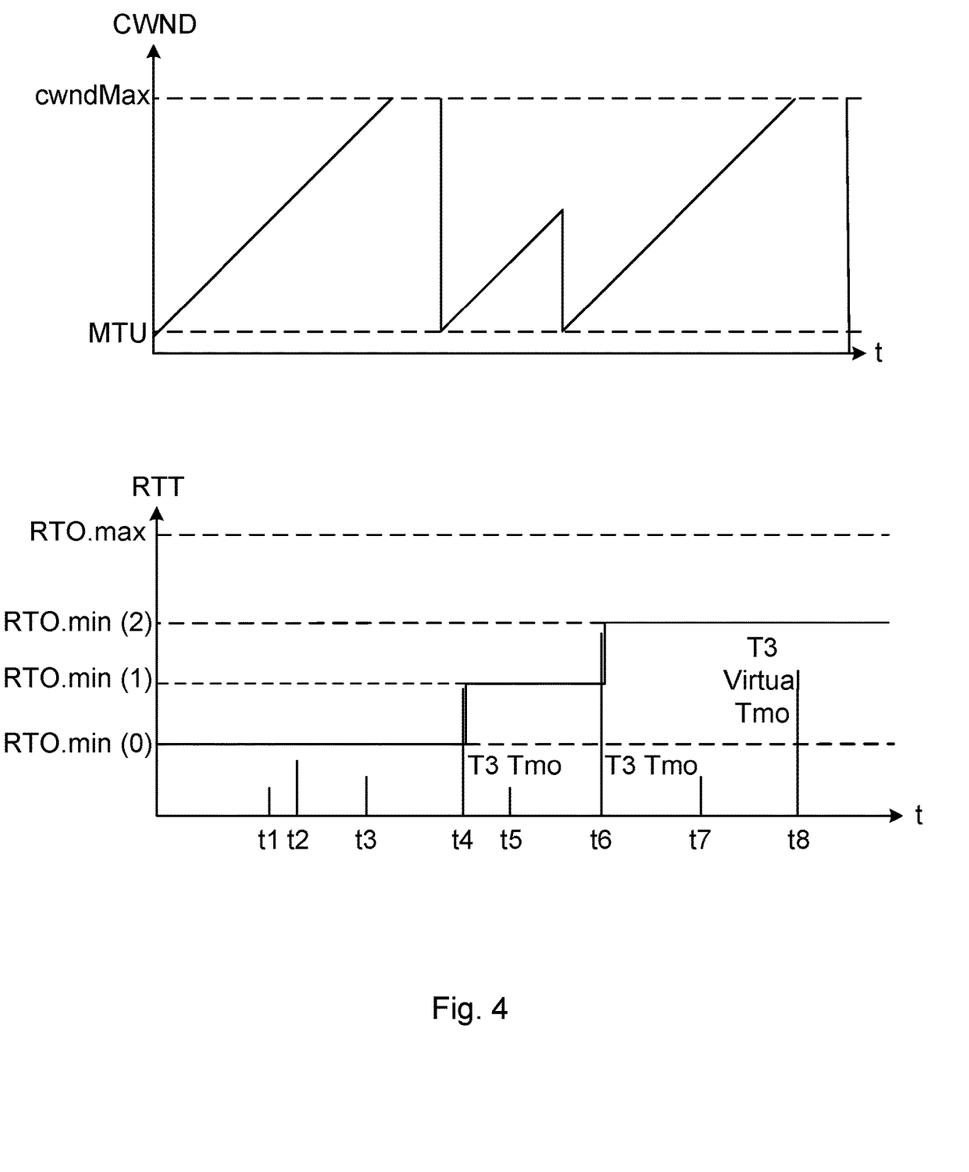
FIG. 4 illustrates behaviour of a packet timeout supervision mechanism according to an embodiment.

FIG. 4 illustrates behaviour of a packet timeout supervision mechanism according to an embodiment when the state machine moves from the Legacy state to Evaluate state. As in FIG. 2, the upper diagram illustrates the dynamic control of the size of the CWND, while the lower diagram illustrates the value of the RTT observed at different points in time $t_n$.

Figure 5:
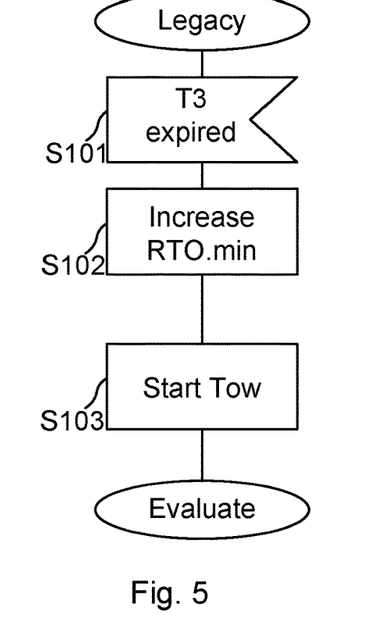
FIG. 5 shows a flowchart illustrating a method of controlling data packet transmission timeout according to an embodiment.

Reference will further be made to FIG. 5 showing a flowchart illustrating behaviour of the state machine when in the Legacy state according to an embodiment.

Again, as RTT values being less than or equal to RTO.min are continuously measured, the size of the CWND is increased until a maximum CWND limit cwndMax is reached reflecting a maximum allowed bandwidth. As is shown in FIGS. 4 and 5, the timer T3 at time $t_4$ is above the RTO timeout value and thereby expires in step S101, i.e. T3>RTO.min, and a timeout occurs (denoted T3 Tmo), in which case the CWND is reset to MTU size. Hence, until time $t_4$ the state machine is in the Legacy state and RTO is computed according to RFC 4960. Again, it is noted that at $t_4$, there is no RTT measurement available.

In this embodiment, when the timeout occurs, the smallest allowed value RTO.min of timer T3 is increased in step S102, and optionally an observation timer Tow is started in step S103, and the state machine moves to the Evaluate state. That is; new RTO.min=old RTO.min+stepValue, where stepValue is appropriately selected. In other words, when a timeout occurs in step S101, the currently set timeout value RTO.min of the retransmission timer T3 is increased in step S102 as: RTO.min(n)=RTO.min(n−1)+stepValue, where n is the order of the timeout occurring in a sequence of timeouts.

The observation timer Tow may be set to a value of for instance ten times the value of RTO.min(0), i.e. to 1000 ms.

In an embodiment, stepValue may for instance be selected to be 10% of the lastly calculated RTO.min, i.e. stepValue=0.1×RTO.min(n−1). In another example, stepValue=0.1×RTO.min(o).

Further, as in the prior art described with reference to RFC 4960, the CWND is reset to MTU size before again being increased to reach the maximum value cwndMax.

Figure 6:
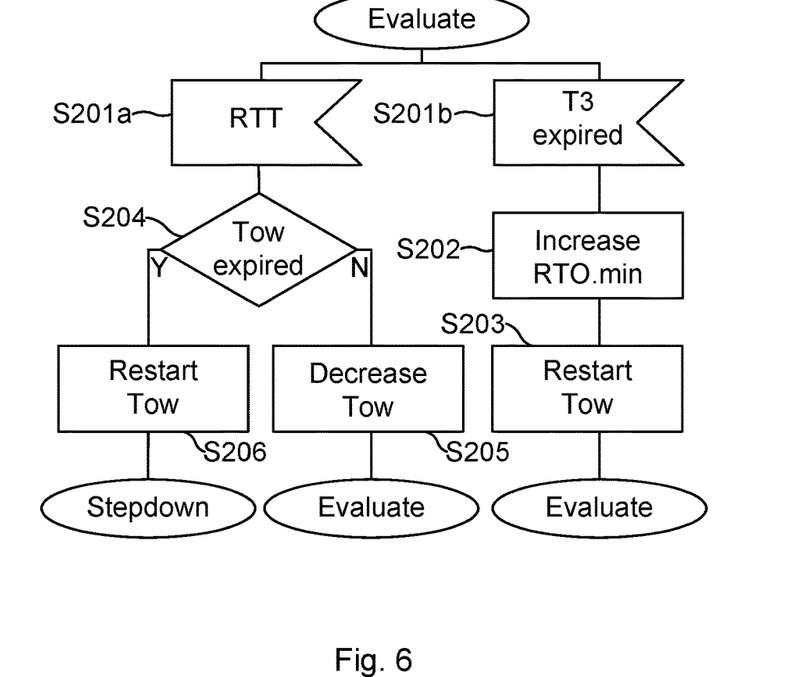
FIG. 6 shows a flowchart illustrating a method of controlling data packet transmission timeout according to an embodiment.

Reference will further be made to FIG. 6 showing a flowchart illustrating a method of controlling data packet transmission timeout according to this embodiment. As previously mentioned, the state machine is triggered by either a new RTT measurement being available or by a T3 timeout occurring, as indicated in steps S201a and S201b, respectively.

As can be seen in FIG. 6, in one branch of the flowchart, similar as in the case when moving from the Legacy state to the Evaluate state described with reference to FIG. 5, a T3 timeout event occurring in step S201b will result in a currently set RTO.min being increased in step S202, and the observation timer Tow being (re)started in step S203, while the state machine remains in the Evaluate state.

As can be seen in FIGS. 4 and 6, a measurement of the observed RTT is available in step S201a at $t_5$. Further, it is determined in step S204 whether or not the state machine should move to Stepdown state for decreasing the currently set timeout value RTO.min(n) of the retransmission timer T3. In this particular embodiment, this is determined by concluding whether the optional observation timer Tow has expired or not.

Advantageously, the observation timer Tow facilitates avoiding a scenario where the state machine spends too long time in the Evaluate state. Should the observation timer Tow has expired in step S204, it is restarted in step S206 and the state machine moves to the Stepdown state. However, in this round it is assumed that the observation timer Tow has not expired in step S204, in which case the observation timer Tow optionally is updated in step S205 and the state machine remains in the Evaluate state.

In an embodiment, for each RTT measurement being available (i.e. as long as timeout does not occur), the updating is performed by decreasing the set observation window timer Tow in step S206. In an example, the Tow is decreased with a value corresponding to the last available RTT value. As a result, the set observation window timer Tow will continuously decrease with each available RTT measurement, thereby continuously decreasing the observation window.

As can be seen in FIGS. 4 and 6, a further timeout occurs at time $t_6$, i.e. T3>RTO.min(i), thereby triggering the state machine in step S201b. Again, RTO.min is increased in step S202: RTO.min(2)=RTO.min(1)+stepValue, and the observation timer Tow is restarted in step S203. As in the Legacy state, the CWND is reset to MTU size.

Advantageously, the controlling of the timeout value RTO.min(n) for the retransmission timer T3 will allow a dynamical and carefully controlled increase of the timeout value of the timer T3 to avoid unnecessary timeouts, i.e. to cause a timeout even though no packets would have been lost.

Thereafter, the state machine is again triggered by the next available measurement of the observed RTT at time $t_7$ in step S201b, and again it is determined that Tow has not expired in step S204 whereupon the Tow is decreased in step S205.

At time $t_8$, a so called virtual timeout occurs during the Evaluate state, in which case the observation window timer Tow may be restarted (not shown in FIG. 6). Alternatively, the virtual timeout is not taken into account, and the state machine acts as if a normal RTT measurement is obtained since effectively the measured RTT for a virtual timeout indeed is below the currently set T3 timeout value, in this case RTO.min(2). A virtual timeout is defined as a situation where the currently available measured RTT value exceeds the initially set timeout value, i.e. RTO.min(0), but not the currently set timeout value RTO.min(2).

In a next step it is assumed that an RTT measurement is performed in Step S201a, but that the observation timer Tow is determined to having expired in step 204, wherein the state machine restarts Tow in step S206 and transits to the Stepdown state.

According to an optional second state machine condition; if the steadily increasing size of the CWND reaches it maximum value cwndMax—occurring just after time $t_8$ in FIG. 4—the state machine will after a set time period move from the Evaluate state to the Stepdown state. It is noted that such transition would have to be triggered by an RTT measurement being available at a time subsequent to $t_8$ or by a timeout at a time subsequent to $t_8$. It is further envisaged that the state machine may move from the Evaluate state to the Stepdown state either if Tow expires or if cwndMax is reached. Hence, the determining of whether or not the size of the CWND has reached cwndMax may be performed in step S206.

Figure 7:
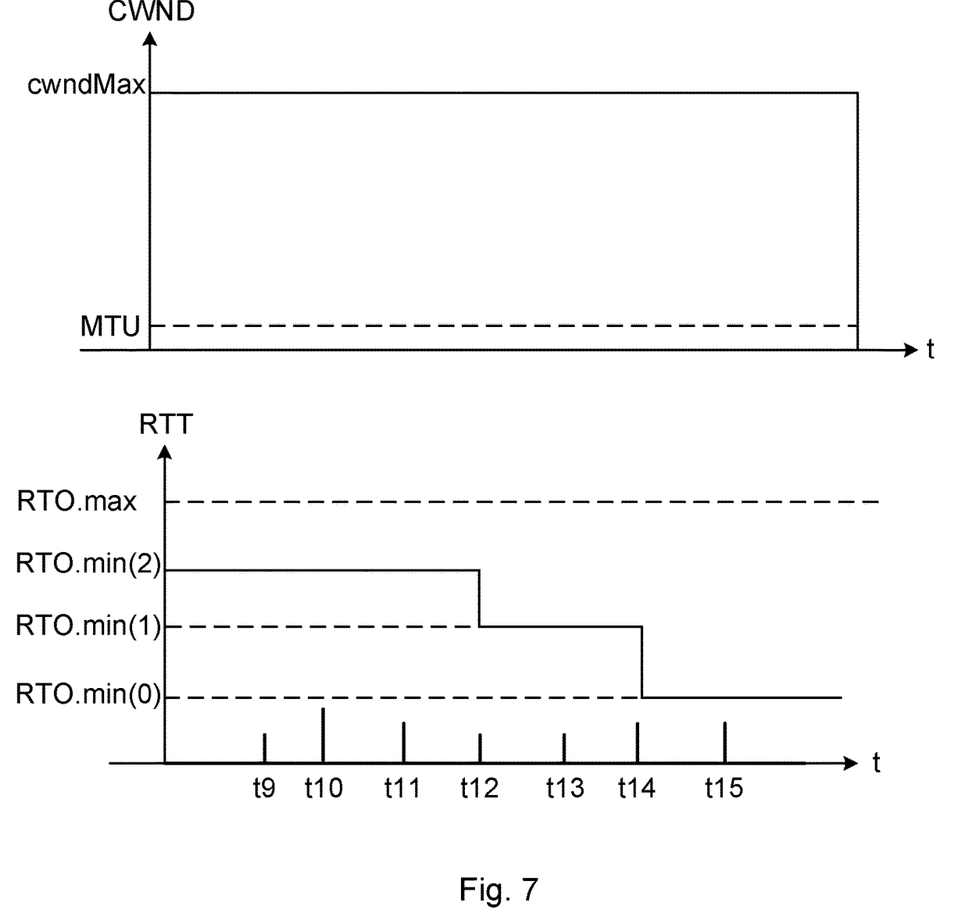
FIG. 7 illustrates behaviour of a packet timeout supervision mechanism according to an embodiment.

FIG. 7 illustrates behaviour of a packet timeout supervision mechanism according to an embodiment when the state machine is in the Stepdown state. As in FIGS. 2 and 4, the upper diagram illustrates the dynamic control of the size of the CWND, while the lower diagram illustrates the value of the RTT observed at different points in time $t_n$.

Figure 8:
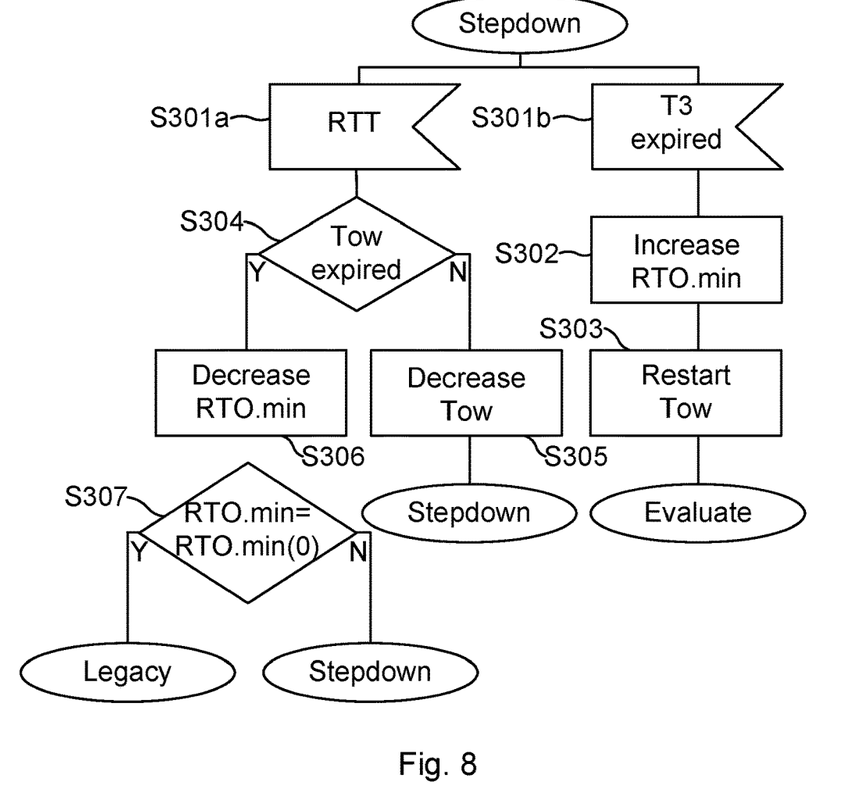
FIG. 8 shows a flowchart illustrating a method of controlling data packet transmission timeout according to an embodiment.

Reference will further be made to FIG. 8 showing a flowchart illustrating a method of controlling data packet transmission timeout according to this embodiment. Again, the state machine is triggered by either a new RTT measurement being available or by a T3 timeout occurring, as indicated in steps S301a and S301b, respectively.

Similar to FIGS. 5 and 6, in one branch of the flowchart, a T3 timeout event occurring in step S301b will result in a currently set RTO.min being increased in step S302, and the observation timer Tow being (re)started in step S303, and the state machine moves to the Evaluate state.

Now, if in the Stepdown state a timeout event would occur, i.e. if the retransmission timer T3 being set to the currently computed RTO.min—in this case RTO.min(2)—would expire as detected in step S301b, the currently set RTO.min(2) would be increased in step S302 (i.e. RTO.min (3)=RTO.min(2)+stepValue), and the observation timer Tow is (re)started in step S303, before the state machine moves back to the Evaluate state. However, in the example of FIG. 7, no timeout occurs. Rather, at $t_9$, a measurement of the observed RTT is available in step S301a, and in case Tow is not determined to having expired in step S304 the Tow is decreased accordingly in step S305, and the state machine remains in the Stepdown state. As can be seen, this behaviour is repeated for the available measurements of the observed RTT at $t_{10}$ and $t_{11}$.

However, upon the measurement of the RTT occurring in step S301a at time $t_{11}$, the state machine concludes in step S304 that the observation timer Tow has expired, and the currently set RTO.min(2) is decreased to RTO.min(1) (or to some other appropriate value) in step S306.

Thereafter, it is concluded in step S307 whether or not the currently set T3 retransmission timer value RTO.min(1) has reached the initially set RTO.min(0), which it in this case has not and the state machine remains in the Stepdown state.

Again, at time $t_{13}$, a measurement of the observed RTT is available in step S301a, and since Tow is not determined to having expired in step S304 the Tow is decreased accordingly in step S3050, and the state machine remains in the Stepdown state.

When there is a measurement available of the observed RTT in step S301a at time $t_{14}$, the state machine concludes in step S304 that the observation timer Tow has expired, and the currently set RTO.min(1) is decreased to RTO.min(0) in step S306.

Thereafter, it is concluded in step S307 whether or not the currently set T3 retransmission timer value has reached RTO.min(0), which indeed is the case and the state machine moves to the Legacy state.

Advantageously, with the embodiment constituting the Stepdown state, the controlling of the timeout value RTO.min for the retransmission timer T3 will allow a dynamical and carefully controlled decrease of the timeout value of the timer T3 to avoid too slow retransmission.

Further, for each RTT measurement being available (i.e. as long as timeout does not occur), the set observation window timer Tow may be decreased as shown in step S305. For instance, the set observation window timer Tow is decreased by the last measured RTT value. As a result, the set observation window timer Tow will continuously decrease with each available RTT measurement.

If a virtual timeout occurs during the Stepdown state, the observation window timer Tow may be restarted. Hence, any virtual timeout occurring during the Stepdown state will have the effect that a decrease of the currently computed RTO.min is delayed. Advantageously, since a virtual timeout indicates that the measured RTT is becoming greater and thus approaches the currently computed RTO.min, it is ensured that the currently computed RTO.min is not decreased too fast.

As soon as the initially set RTO.min—i.e. RTO.min(0)—is reached, the state machine moves from the Stepdown state to the Legacy state where RTO again is updated according equation (1), in line with RFC 4960. With reference to FIG. 7, in this particular example, this occurs at time $t_{14}$.

Figure 9:
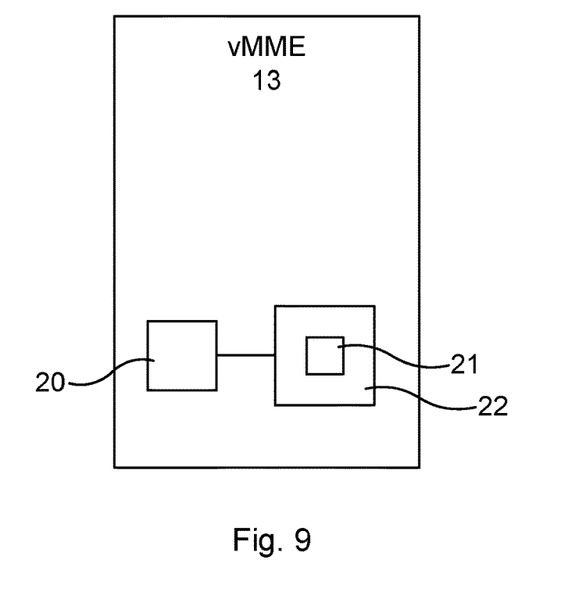
FIG. 9 illustrates a node configured to control timeout for data packet transmissions in a wireless communications network according to an embodiment.

With reference to FIG. 9, the steps of the method of a node 13, such as the vMME, for controlling timeout for data packet transmissions in a wireless communications network according to embodiments are in practice performed by a processing unit 20 embodied in the form of one or more microprocessors arranged to execute a computer program 21 downloaded to a suitable storage medium 22 associated with the microprocessor, such as a Random Access Memory (RAM), a Flash memory or a hard disk drive. The processing unit 20 is arranged to cause the node 13 to carry out the method according to embodiments when the appropriate computer program 21 comprising computer-executable instructions is downloaded to the storage medium 22, being e.g. a non-transitory storage medium, and executed by the processing unit 20. The storage medium 22 may also be a computer program product comprising the computer program 51. Alternatively, the computer program 21 may be transferred to the storage medium 22 by means of a suitable computer program product, such as a Digital Versatile Disc (DVD) or a memory stick. As a further alternative, the computer program 21 may be downloaded to the storage medium 22 over a network. The processing unit 20 may alternatively be embodied in the form of a digital signal processor (DSP), an application specific integrated circuit (ASIC), a field-programmable gate array (FPGA), a complex programmable logic device (CPLD), etc.

The aspects of the present disclosure have mainly been described above with reference to a few embodiments and examples thereof. However, as is readily appreciated by a person skilled in the art, other embodiments than the ones disclosed above are equally possible within the scope of the disclosure, as defined by the appended patent claims.

The invention claimed is:

1. A method of controlling a timeout event for a data packet transmission in a wireless communications network, a data packet retransmission timer initially being set to a timeout value indicating a maximum allowed round-trip time, RTT, for the data packet transmission and a timeout event occurs upon the retransmission timer expiring, the method comprising:

observing a RTT for the data packet transmission over a connection in the network;

increasing, upon the retransmission timer expiring before a measured value is available for the observed RTT, the timeout value for the retransmission timer; and
determining whether a currently set timeout value for the retransmission timer is to be decreased based on a size of a data packet congestion window reaching a predetermined maximum value.

2. The method of claim 1, further comprising:
starting an observation timer upon the timeout value for the retransmission timer being increased.

3. The method of claim 2, wherein the determining whether a currently set timeout value for the retransmission timer is to be decreased comprises:
determining whether a set observation timer has expired, and if so restarting the observation timer; and
upon a measured value being available for the observed RTT, decreasing the currently set timeout value after an observation period is determined to have expired.

4. The method of claim 3, wherein the determining whether a currently set timeout value for the retransmission timer is to be decreased comprises:
determining if the decreased currently set timeout value has reached the initially set timeout value, wherein the timeout value of the retransmission timer is controlled according to RFC 4960.

5. The method of claim 3, wherein when is determined that a currently set timeout value for the retransmission timer is not to be decreased, the method further comprising:
decreasing a set value of the observation timer.

6. The method of claim 3, wherein the determining whether a currently set timeout value for the retransmission timer is to be decreased comprises:
determining whether the size of the data packet congestion window has reached the predetermined maximum value, and if so restarting the observation timer; and
upon a measured value being available for the observed RTT, decreasing the currently set timeout value after an observation period is determined to have expired.

7. The method of claim 3, wherein the initially set timeout value is set to a minimum allowable retransmission timeout, RTO, value.

8. The method of claim 2, wherein when is determined that a currently set timeout value for the retransmission timer is not to be decreased, the method further comprising:
decreasing a set value of the observation timer.

9. The method of claim 2, wherein the determining whether a currently set timeout value for the retransmission timer is to be decreased comprises:
determining whether a size of a data packet congestion window has reached a predetermined maximum value, and if so restarting the observation timer; and
upon a measured value being available for the observed RTT, decreasing the currently set timeout value after an observation period is determined to have expired.

10. The method of claim 2, wherein the initially set timeout value is set to a minimum allowable retransmission timeout, RTO, value.

11. The method of claim 1, wherein the determining whether a currently set timeout value for the retransmission timer is to be decreased comprises:
determining whether the size of the data packet congestion window has reached the predetermined maximum value, and if so restarting an observation timer; and
upon a measured value being available for the observed RTT, decreasing the currently set timeout value after an observation period is determined to have expired.

12. The method of claim 1, wherein the initially set timeout value is set to a minimum allowable retransmission timeout, RTO, value.

13. A node configured to control a timeout event for a data packet transmission in a wireless communications network, a data packet retransmission timer initially being set to a timeout value indicating a maximum allowed round-trip time, RTT, for the data packet transmission and a timeout event occurs upon the retransmission timer expiring, the node comprising a processing unit and a memory, the memory containing instructions executable by the processing unit, to cause the node to:
observe a RTT for the data packet transmission over a connection in the network;
increase, upon the retransmission timer expiring before a measured value is available for the observed RTT, the timeout value for the retransmission timer; and
determine whether a currently set timeout value for the retransmission timer is to be decreased based on a size of a data packet congestion window reaching a predetermined maximum value.

14. The node of claim 13, further caused to:
start an observation timer upon the timeout value for the retransmission timer being increased.

15. The node of claim 14, further caused to, when determining whether a currently set timeout value for the retransmission timer is to be decreased:
determine whether a set observation timer has expired, and if so restart the observation timer; and
upon a measured value being available for the observed RTT, decrease the currently set timeout value after an observation period is determined to have expired.

16. The node of claim 15, further caused to, when determining whether a currently set timeout value for the retransmission timer is to be decreased:
determine if the decreased currently set timeout value has reached the initially set timeout value, wherein the timeout value of the retransmission timer is controlled according to RFC 4960.

17. The node of claim 14, further caused to, when it is determined that a currently set timeout value for the retransmission timer is not to be decreased:
decrease a set value of the observation timer.

18. The node of claim 13, further caused to, when determining whether a currently set timeout value for the retransmission timer is to be decreased:
determine whether the size of the data packet congestion window has reached the predetermined maximum value, and if so restart an observation timer; and
upon a measured value being available for the observed RTT, decrease the currently set timeout value after an observation period is determined to have expired.

19. The node of claim 13, wherein the initially set timeout value is set to a minimum allowable retransmission timeout, RTO, value.

20. A non-transitory computer storage medium storing an executable computer program that when executed, cause a node to perform a method of controlling a timeout event for a data packet transmission in a wireless communications network, a data packet retransmission timer initially being set to a timeout value indicating a maximum allowed round-trip time, RTT, for the data packet transmission and a timeout event occurs upon the retransmission timer expiring, the method comprising:
observing a RTT for the data packet transmission over a connection in the network;

increasing, upon the retransmission timer expiring before a measured value is available for the observed RTT, the timeout value for the retransmission timer; and determining whether a currently set timeout value for the retransmission timer is to be decreased based on a size of a data packet congestion window reaching a predetermined maximum value.

\* \* \* \* \*